United States Patent
Shaw et al.

(10) Patent No.: US 12,424,901 B2
(45) Date of Patent: Sep. 23, 2025

(54) PLANAR STATOR CONFIGURATIONS FOR AXIAL FLUX MACHINES

(71) Applicant: E-Circuit Motors, Inc., Needham Heights, MA (US)

(72) Inventors: Steven Robert Shaw, Bozeman, MT (US); George Harder Milheim, Bozeman, MT (US)

(73) Assignee: E-Circuit Motors, Inc., Needham Heights, MA (US)

( * ) Notice: Subject to any disclaimer, the term of this patent is extended or adjusted under 35 U.S.C. 154(b) by 189 days.

(21) Appl. No.: 18/113,857

(22) Filed: Feb. 24, 2023

(65) Prior Publication Data

US 2023/0246525 A1     Aug. 3, 2023

Related U.S. Application Data

(62) Division of application No. 17/671,084, filed on Feb. 14, 2022, now Pat. No. 11,626,779.

(60) Provisional application No. 63/150,129, filed on Feb. 17, 2021.

(51) Int. Cl.
    *H02K 7/104*      (2006.01)

(52) U.S. Cl.
    CPC .................... *H02K 7/104* (2013.01)

(58) Field of Classification Search
    CPC ................ H02K 7/10; H02K 7/104
See application file for complete search history.

(56) References Cited

U.S. PATENT DOCUMENTS

| | | |
|---|---|---|
| 2,970,238 A | 1/1961 | Swiggett |
| 3,096,455 A | 7/1963 | Hahn |
| 4,045,696 A | 8/1977 | Lutz et al. |
| 4,115,915 A | 9/1978 | Godfrey |
| 4,658,162 A | 4/1987 | Koyama et al. |
| 4,677,332 A | 6/1987 | Heyraud |

(Continued)

FOREIGN PATENT DOCUMENTS

| | | |
|---|---|---|
| CN | 201204540 Y | 3/2009 |
| CN | 103001426 A | 3/2013 |

(Continued)

OTHER PUBLICATIONS

Final Examination Report mailed Jul. 2, 2024 for Singapore Patent Application No. 11202305621S.

(Continued)

*Primary Examiner* — Eric Johnson
(74) *Attorney, Agent, or Firm* — Pierce Atwood LLP

(57) ABSTRACT

In some embodiments, two or more different types of stator structures may be disposed within a gap of an axial flux machine. Such arrangements may be advantageous, for example, for producing a machine optimized for multiple modes of operation, such as mechanical torque generation, conversion of mechanical torque to electrical power, and/or dissipation of mechanical power. Further, in some embodiments, an axial flux machine may include a planar stator having a winding arranged to be positioned within the machine's active region, and may further include at least one switch configured to be selectively closed to establish an electrical connection between respective ends of the winding at a time that the winding is not coupled to an external power source.

20 Claims, 11 Drawing Sheets

(56) References Cited

U.S. PATENT DOCUMENTS

| | | | |
|---|---|---|---|
| 4,733,115 A | 3/1988 | Barone et al. |
| 4,804,574 A | 2/1989 | Osawa et al. |
| 5,099,162 A | 3/1992 | Sawada |
| 5,126,613 A | 6/1992 | Choi |
| 5,332,460 A | 7/1994 | Hosoya |
| 5,616,977 A | 4/1997 | Hill |
| 5,644,183 A | 7/1997 | Van Loenen et al. |
| 5,710,476 A | 1/1998 | Ampela |
| 5,773,905 A | 6/1998 | Hill |
| 5,952,742 A | 9/1999 | Stoiber et al. |
| 6,084,325 A * | 7/2000 | Hsu ..................... H02K 7/106 188/161 |
| 6,628,038 B1 | 9/2003 | Shikayama et al. |
| 7,109,625 B1 | 9/2006 | Jore et al. |
| 7,112,910 B2 | 9/2006 | Lopatinsky et al. |
| 7,301,428 B2 | 11/2007 | Suzuki et al. |
| 7,415,756 B2 | 8/2008 | Ishida et al. |
| 7,523,540 B2 | 4/2009 | Morel |
| 7,582,999 B2 | 9/2009 | Atkinson |
| 7,750,522 B2 | 7/2010 | Gizaw et al. |
| 7,763,997 B2 | 7/2010 | Dubuc et al. |
| 7,812,697 B2 | 10/2010 | Fullerton et al. |
| 7,882,613 B2 | 2/2011 | Barthelmie et al. |
| 7,888,904 B2 | 2/2011 | Mularcik |
| 8,058,762 B2 | 11/2011 | Asano |
| 8,179,002 B2 | 5/2012 | Mancuso et al. |
| 8,225,497 B2 | 7/2012 | Johnson et al. |
| 8,339,019 B1 | 12/2012 | Oyague |
| 8,362,731 B2 | 1/2013 | Smith et al. |
| 8,397,369 B2 | 3/2013 | Smith et al. |
| 8,400,038 B2 | 3/2013 | Smith et al. |
| 8,558,425 B2 | 10/2013 | Stahlhut et al. |
| 8,598,761 B2 | 12/2013 | Langford et al. |
| 8,692,637 B2 | 4/2014 | Richards et al. |
| 8,716,913 B2 | 5/2014 | Kvam et al. |
| 8,723,052 B1 | 5/2014 | Sullivan et al. |
| 8,723,402 B2 | 5/2014 | Oyague |
| 8,736,133 B1 | 5/2014 | Smith et al. |
| 8,785,784 B1 | 7/2014 | Duford et al. |
| 8,816,543 B2 | 8/2014 | Kozar et al. |
| 8,823,241 B2 | 9/2014 | Jore et al. |
| 8,941,961 B2 | 1/2015 | Banerjee et al. |
| 9,013,257 B2 | 4/2015 | Steingroever |
| 9,030,071 B2 | 5/2015 | Bradley et al. |
| 9,154,024 B2 | 10/2015 | Jore et al. |
| 9,269,483 B2 | 2/2016 | Smith et al. |
| 9,479,038 B2 | 10/2016 | Smith et al. |
| 9,673,684 B2 | 6/2017 | Shaw |
| 9,762,099 B2 | 9/2017 | Jore et al. |
| 9,859,763 B2 | 1/2018 | Shaw |
| 10,135,310 B2 | 11/2018 | Schuler et al. |
| 10,211,694 B1 | 2/2019 | Shaw |
| 10,819,174 B2 | 10/2020 | Schuler et al. |
| 2002/0145360 A1 | 10/2002 | Pullen |
| 2005/0067905 A1 | 3/2005 | Maney et al. |
| 2005/0194855 A1 | 9/2005 | Hasbe et al. |
| 2006/0055265 A1 | 3/2006 | Zalusky |
| 2006/0202584 A1 | 9/2006 | Jore et al. |
| 2007/0216247 A1 | 9/2007 | Lee |
| 2008/0067874 A1 | 3/2008 | Tseng |
| 2008/0100166 A1 | 5/2008 | Stahlhut et al. |
| 2009/0021333 A1 | 1/2009 | Fiedler |
| 2009/0072640 A1 | 3/2009 | Tanaka |
| 2009/0072651 A1 | 3/2009 | Yan et al. |
| 2010/0000112 A1 | 1/2010 | Carow et al. |
| 2010/0123372 A1 | 5/2010 | Huang et al. |
| 2011/0024146 A1 | 2/2011 | Katou et al. |
| 2011/0241460 A1 | 10/2011 | Mebarki et al. |
| 2011/0241470 A1 | 10/2011 | Takeuchi |
| 2011/0273048 A1 | 11/2011 | Jore et al. |
| 2012/0033236 A1 | 2/2012 | Tsugimura |
| 2012/0041062 A1 | 2/2012 | Zhou et al. |
| 2012/0212080 A1 | 8/2012 | Jiang et al. |
| 2012/0217831 A1 | 8/2012 | Jore et al. |
| 2012/0262019 A1 | 10/2012 | Smith et al. |
| 2012/0262020 A1 | 10/2012 | Smith et al. |
| 2013/0049500 A1 | 2/2013 | Shan et al. |
| 2013/0052491 A1 | 2/2013 | Bull et al. |
| 2013/0053942 A1 | 2/2013 | Kamel et al. |
| 2013/0062984 A1 | 3/2013 | Tremelling |
| 2013/0072604 A1 | 3/2013 | Bowen, III et al. |
| 2013/0076192 A1 | 3/2013 | Tanimoto |
| 2013/0119802 A1 | 5/2013 | Smith et al. |
| 2013/0193793 A1 | 8/2013 | Horng |
| 2013/0214631 A1 | 8/2013 | Smith et al. |
| 2013/0234566 A1 | 9/2013 | Huang et al. |
| 2014/0021968 A1 | 1/2014 | Lee |
| 2014/0021969 A1 | 1/2014 | Tseng et al. |
| 2014/0021972 A1 | 1/2014 | Barabi et al. |
| 2014/0028149 A1 | 1/2014 | Oyague |
| 2014/0035414 A1 | 2/2014 | Hsieh |
| 2014/0042868 A1 | 2/2014 | Sullivan et al. |
| 2014/0152136 A1 | 6/2014 | Duford et al. |
| 2014/0175922 A1 | 6/2014 | Jore et al. |
| 2014/0201291 A1 | 7/2014 | Russell |
| 2014/0262499 A1 | 9/2014 | Smith et al. |
| 2014/0268460 A1 | 9/2014 | Banerjee et al. |
| 2014/0300223 A1 | 10/2014 | Yamada et al. |
| 2014/0368079 A1 | 12/2014 | Wong et al. |
| 2015/0084446 A1 | 3/2015 | Atar |
| 2015/0188375 A1 | 7/2015 | Sullivan et al. |
| 2015/0188391 A1 | 7/2015 | Carron et al. |
| 2015/0311756 A1 | 10/2015 | Sullivan |
| 2015/0318751 A1 | 11/2015 | Smith et al. |
| 2015/0349609 A1 | 12/2015 | Tremelling et al. |
| 2016/0247616 A1 | 8/2016 | Smith et al. |
| 2016/0285327 A1 | 9/2016 | Sasaki et al. |
| 2016/0336824 A1 | 11/2016 | Duan et al. |
| 2016/0372995 A1 | 12/2016 | Smith et al. |
| 2017/0040878 A1 | 2/2017 | Smith et al. |
| 2017/0047792 A1 | 2/2017 | Klassen et al. |
| 2017/0098973 A1 | 4/2017 | Shaw |
| 2020/0044524 A1 | 2/2020 | van Ginkel |
| 2021/0143691 A1 | 5/2021 | Lee et al. |
| 2021/0203213 A1 | 7/2021 | Jore et al. |

FOREIGN PATENT DOCUMENTS

| | | |
|---|---|---|
| CN | 202856473 U | 4/2013 |
| CN | 103580412 A | 2/2014 |
| CN | 104426263 A | 3/2015 |
| CN | 104467243 A | 3/2015 |
| CN | 105896760 A | 8/2016 |
| CN | 111903045 A | 11/2020 |
| DE | 19954196 A1 | 6/2000 |
| DE | 102019131198 A1 | 12/2020 |
| EP | 0300126 A1 | 1/1989 |
| EP | 0563852 A1 | 10/1993 |
| EP | 1086523 A2 | 3/2001 |
| EP | 2139106 A1 | 12/2009 |
| EP | 2696481 A2 | 2/2014 |
| EP | 2882079 A2 | 6/2015 |
| EP | 3340436 A1 | 6/2018 |
| FR | 2262880 A1 | 9/1975 |
| GB | 2030790 A | 4/1980 |
| GB | 2466436 A | 6/2010 |
| GB | 2485185 A | 5/2012 |
| JP | 5836145 A | 3/1983 |
| JP | 59213287 A | 12/1984 |
| JP | 2016-137821 A | 8/2016 |
| JP | 2018-085799 A | 5/2018 |
| JP | 2020-527014 A | 8/2020 |
| WO | 2004073365 A2 | 8/2004 |
| WO | 2009068079 A1 | 6/2009 |
| WO | 2016186533 A1 | 11/2016 |
| WO | 2020108505 A1 | 6/2020 |

OTHER PUBLICATIONS

International Search Report and Written Opinion, issued May 30, 2022, for International Patent Application No. PCT/US2022/016316.

(56) References Cited

OTHER PUBLICATIONS

Office Action and Search Report issued Apr. 9, 2025 for Taiwanese Patent Application No. 111105715.
Official Action issued Jun. 3, 2025 for Japanese Patent Application No. 2023-548864.

* cited by examiner

PLANAR STATOR CONFIGURATIONS FOR AXIAL FLUX MACHINES

CROSS-REFERENCE TO RELATED APPLICATIONS

This application is a divisional and claims the benefit under 35 U.S.C. § 120 and 35 U.S.C. § 121 of U.S. patent application Ser. No. 17/671,084, entitled PLANAR STATOR HAVING DISCRETE SEGMENTS WITH DIFFERENT WINDING CHARACTERISTICS, filed Feb. 14, 2022, and which claims the benefit under 35 U.S.C. § 119(e) of U.S. Provisional Application No. 63/150,129, entitled MULTI-STATOR AXIAL FLUX MACHINE, filed Feb. 17, 2021.

BACKGROUND

Axial flux motors and generators described by several patents, including U.S. Pat. No. 7,109,625 ("the '625 patent"), the entire contents of which are incorporated herein by reference, feature a planar printed circuit board stator assembly interposed between a rotor assembly supporting magnets with alternating north-south poles. The magnetic flux between the magnets interacts with the current density supported by the traces in the printed circuit stator to produce a torque.

An electrical machine of this type can operate either as a motor or a generator, and has a number of useful properties, including that the torque as a function of angle can be smooth and possess high quality of motion.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a planar stator for an axial flux machine (having a rotor that includes one or more magnets that generate first magnetic flux, generally parallel to an axis of rotation of the rotor, in an active region within a gap of the axial flux machine) comprises at least first, second, third, and fourth terminals, each adapted to be connected to circuitry external to the planar stator; at least one first winding arranged to be positioned within the active region, the at least one first winding having first and second ends electrically connected to the first and second terminals, respectively, wherein an electrical characteristic between the first and second terminals, as measured when the first and second terminals are not connected to the circuitry, has a first value; and at least one second winding arranged to be positioned within the active region, the at least one second winding being electrically isolated from the at least one first winding and having third and fourth ends electrically connected to the third and fourth terminals, respectively, wherein the electrical characteristic between the third and fourth terminals, as measured when the third and fourth terminals are not connected to the circuitry, has a second value which is substantially different than the first value.

In some embodiments, a planar stator for an axial flux machine (having a rotor that includes one or more magnets that generate first magnetic flux, generally parallel to an axis of rotation of the rotor, in an active region within a gap of the axial flux machine) comprises a first conductive sheet arranged to be positioned within the active region so that generation of eddy currents within the first conductive sheet imposes a drag force on the rotor; and at least a first winding arranged to be positioned within the active region, the first winding having at least first and second terminals electrically connected to respective ends of the first winding.

In some embodiments, a planar stator for an axial flux machine (having a rotor that includes one or more magnets that generate first magnetic flux, generally parallel to an axis of rotation of the rotor, in an active region within a gap of the axial flux machine) comprises at least a first winding arranged to be positioned within the active region, the first winding having at least first and second terminals electrically connected to respective ends of the first winding; and at least one switch configured to be selectively closed to establish an electrical connection between the first and second terminals at a time that the first winding is not coupled to an external power source.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

DETAILED DESCRIPTION

A variation of the machine described in the '625 patent uses a stator that does not describe a complete annulus. In particular, one or more planar stator segments, made using printed circuit board (PCB) fabrication or similar techniques, may be disposed in the gap between rotors. This type of machine, described in U.S. Patent Application Publication No. 2020/067361 ("the '361 Publication"), the entire contents of which are incorporated herein by reference, can support angle-dependent torque requirements. In these kinds of applications, portions of the rotor that are densely populated with magnets align with the stator segment at angles for which maximum torque is required. Also discussed in the '361 Publication is the possibility of a machine in which the stator includes one or more segments, but the rotor is similar to the rotor in the '625 patent in the sense of being uniformly populated with magnetic poles. A machine similar to that described in the '625 patent can be made by assembling a complete annular ring from segments, as opposed to making the machine from a monolithic circuit board.

Disclosed herein, among other things, is an axial flux electric machine incorporating multiple stator structures disposed within a gap between rotors in which at least two of the stator structures have different functions (including the possibility of one of structures being a conductive sheet that introduces current braking but cannot produce motor action or operate as a generator). Such a configuration may result in an electric machine with thermal, electrical, and mechanical properties that could not be achieved with a single stator structure or multiple identical stator structures. In some implementations, such functionality may be achieved by disposing respective stator segments at different angular positions, relative to the axis of rotation of the machine, within the gap. In other implementations, different stator structures may be arranged so as to overlap with one another, at least in part, within the gap, such as by disposing respective stator structures on different layers of the same printed circuit board.

The inventors have also recognized and appreciated that certain of the stator structures disclosed herein, and/or the external circuitry associated with those structures, are themselves novel and, when employed within an axial flux machine, allow for new and advantageous functionalities to be achieved. Thus, as described in more detail below, certain of the novel stator structures disclosed herein need not be employed together with one or more other types of stator structures in accordance with some embodiments.

Figure 1:
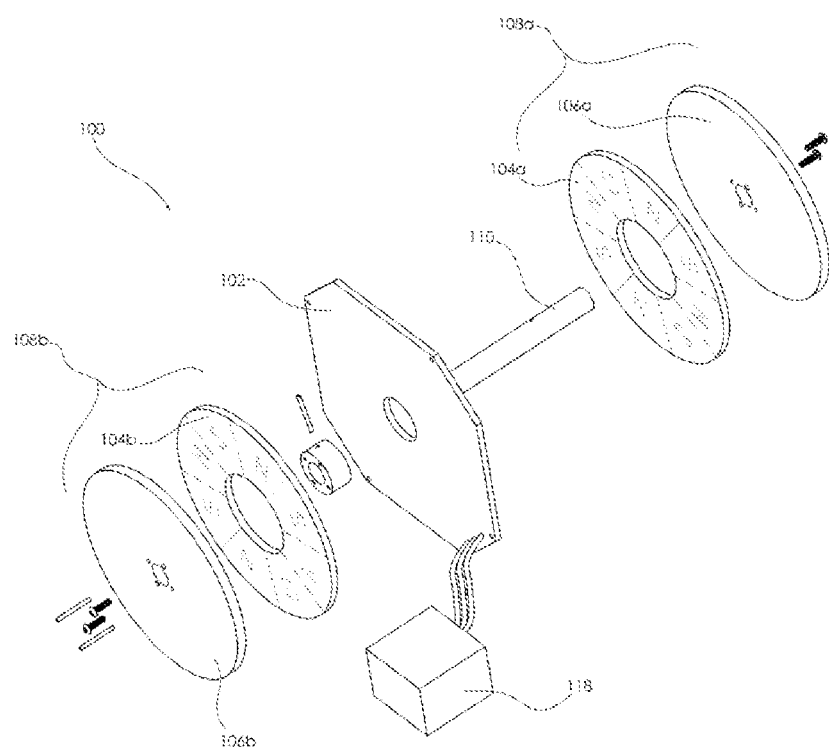
FIG. 1 shows an exploded view of internal components of an example axial flux machine with a planar stator.
Figure 2:
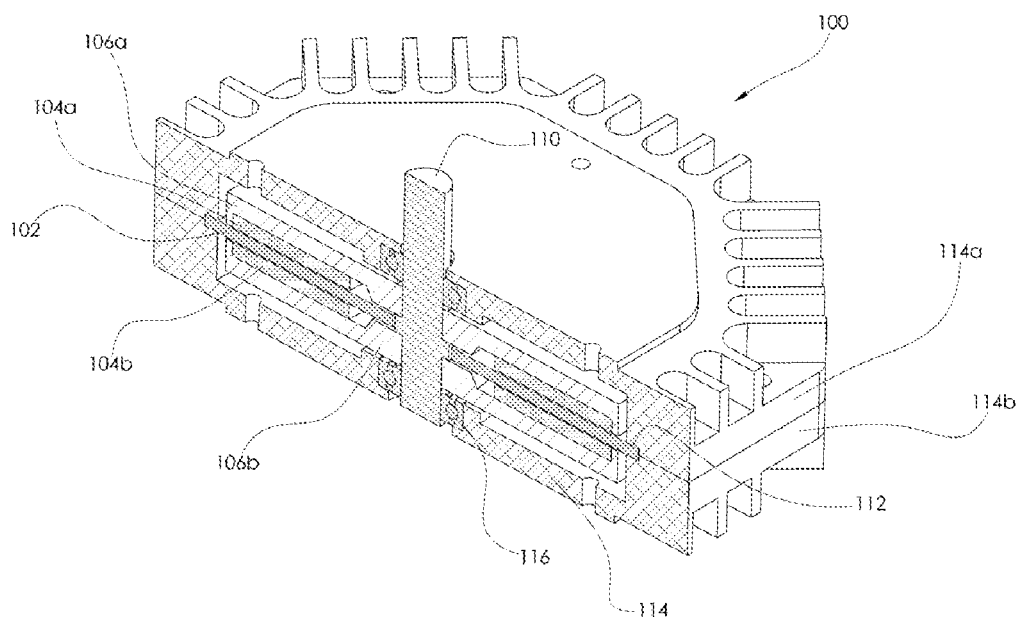
FIG. 2 shows a sectioned view of an axial flux machine including the components shown in FIG. 1.

FIGS. 1 and 2 show exploded and sectioned views, respectively, of a planar stator axial flux machine 100. As shown in these figures, a planar stator 102 may be placed in the gap of a magnetic circuit established by components of a rotor. As shown best in FIG. 1, the rotor may include magnets 104a, 104b and support structures 106a, 106b that together form a pair of rotor assemblies 108a, 108b that may be attached to a shaft 110 of the rotor. As shown in FIG. 2, an outer edge 112 of the stator 102 may be fixedly secured to a housing 114 (e.g., by being held between respective sections 114a, 114b of the housing 114), whereas the rotor shaft 110 (to which the rotor assemblies 108a, 108b are attached) may be rotatable relative to the housing 114 (e.g., via bearings 116).

In motor mode, a current density that rotates synchronously about the rotor's axis of rotation may be imposed on the stator 102 by a controller 118 (shown in FIG. 1). The interaction of this current density with the magnetic flux in the gap from the rotor assemblies 108a, 108b leads to a torque of electromagnetic origin. The controller 118 may be operated such that the energy conversion effected by this structure is bidirectional, in the sense that the electric machine may absorb power from the mechanical terminals and deliver it to the electrical terminals, or it may deliver power to the mechanical terminals. Under appropriate control, a machine of this kind may simulate a variety of mechanical loads including components of friction, moment of inertia, and similar.

Figure 3:
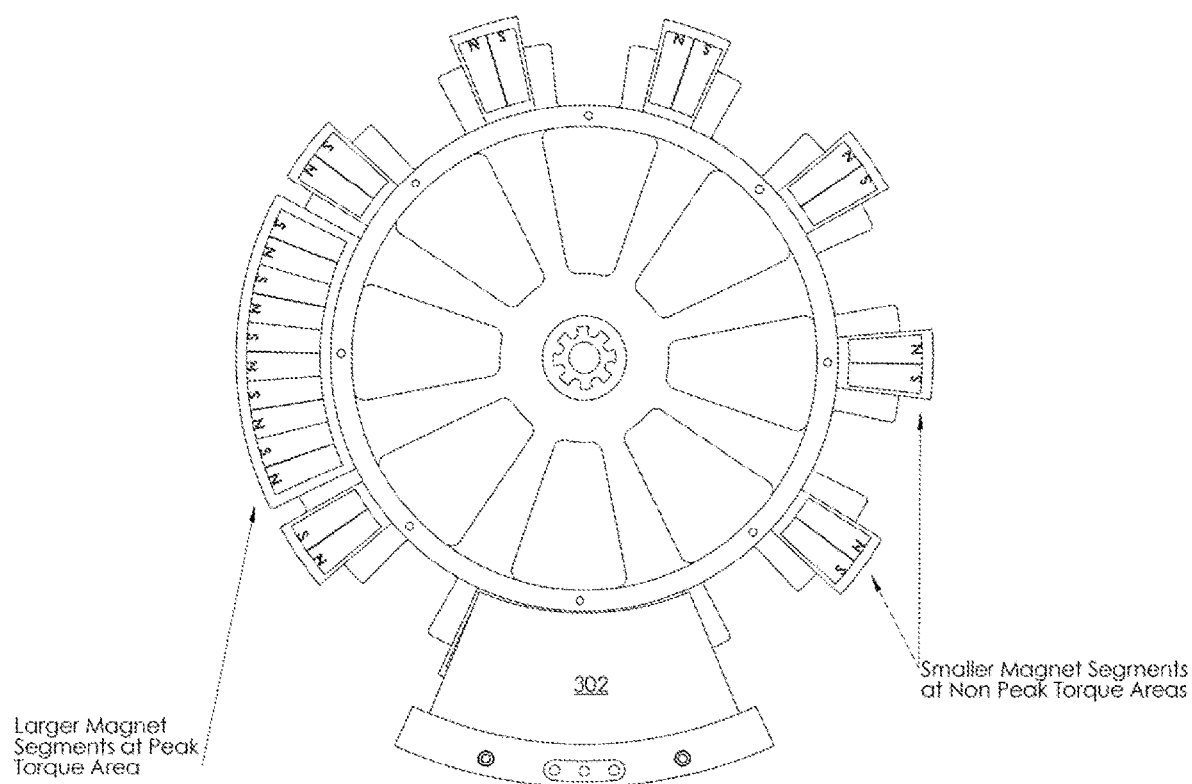
FIG. 3 shows a variation of an axial flux machine including a planar stator segment.

FIG. 3 shows a variation of a planar axial flux machine in which the stator is not an annulus, but a segment 302. There may be various advantages to producing the stator in this manner, identified in the '361 Publication, including that the machine can be designed for higher manufacturing efficiency and/or to suit loads that are periodic in nature. This may be especially advantageous when the radius of the machine is large.

As noted above, in accordance with some aspects present disclosure, two or more different types of stator structures may be disposed within a gap of an axial flux machine, such as the planar axial flux machine 100 described above. Such arrangements may be advantageous, for example, for producing a machine optimized for multiple modes of operation, such as mechanical torque generation, conversion of mechanical torque to electrical power, and/or dissipation of mechanical power.

Figure 4:
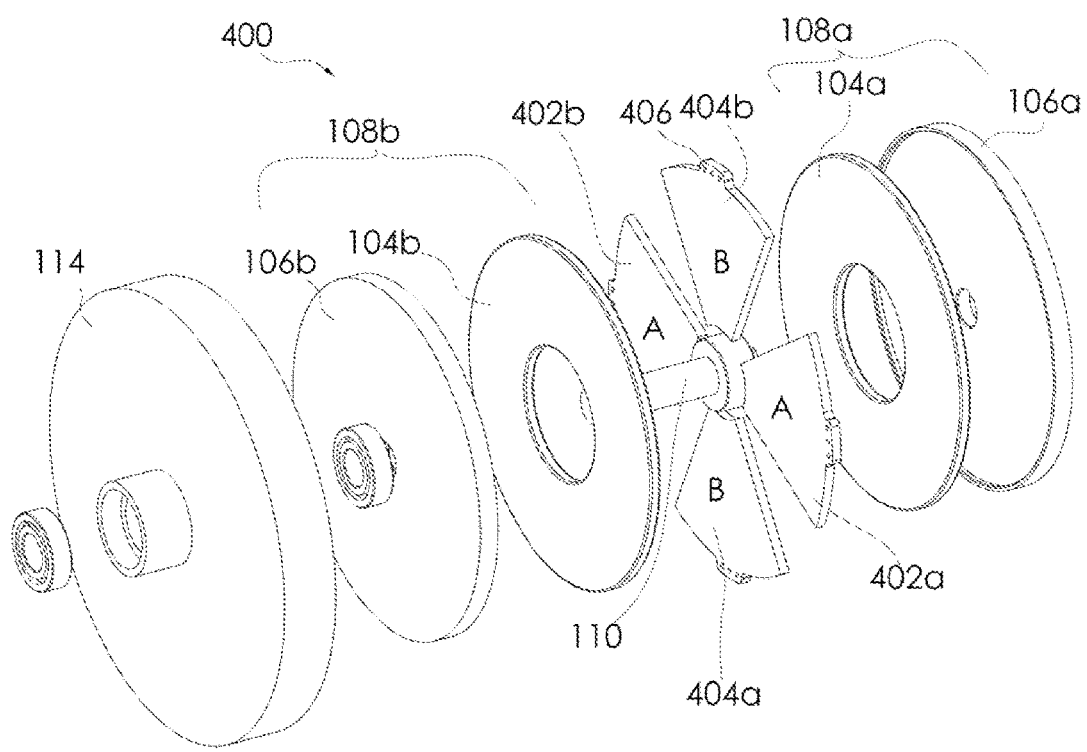
FIG. 4 shows an exploded view of internal components of an example axial flux machine with a planar stator that is configured in accordance with some embodiments of the present disclosure.
Figure 5:
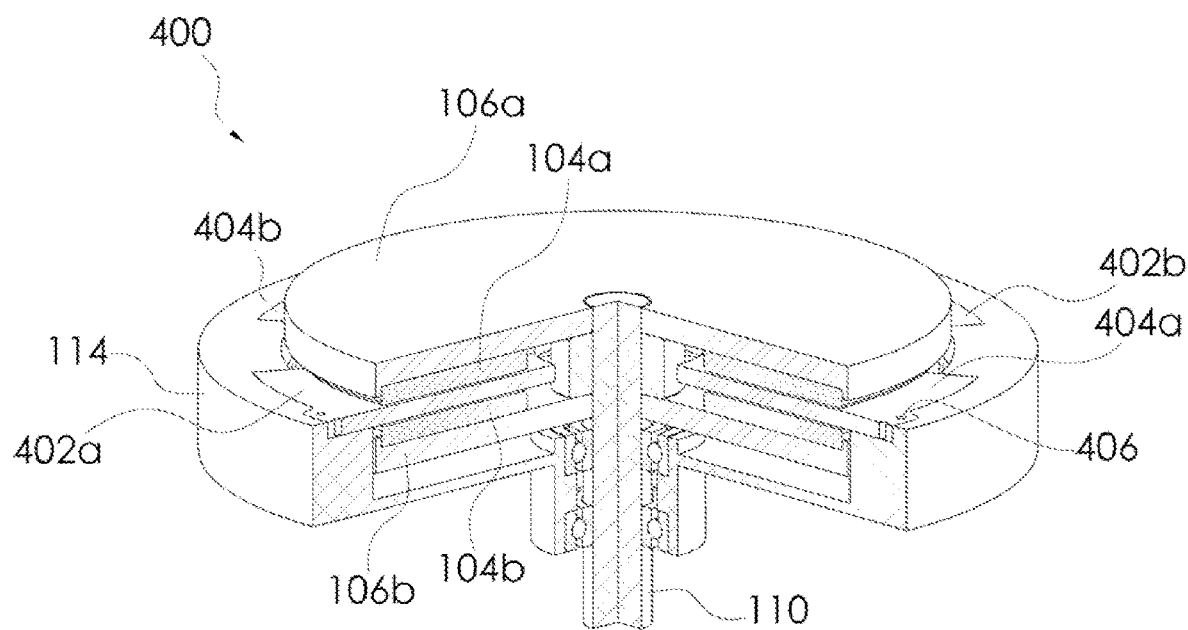
FIG. 5 shows a sectioned view of an axial flux machine including the components shown in FIG. 6.

FIGS. 4 and 5 show exploded and sectioned views, respectively, of one possible construction of such a planar axial flux machine 400. In the illustrated example, the machine 400 includes four stator segments 402a, 402b, 404a, 404b that are angularly offset from one another with respect to the rotor's axis of rotation. In other implementations, the machine 400 may instead have additional or fewer segments.

Figure 6:
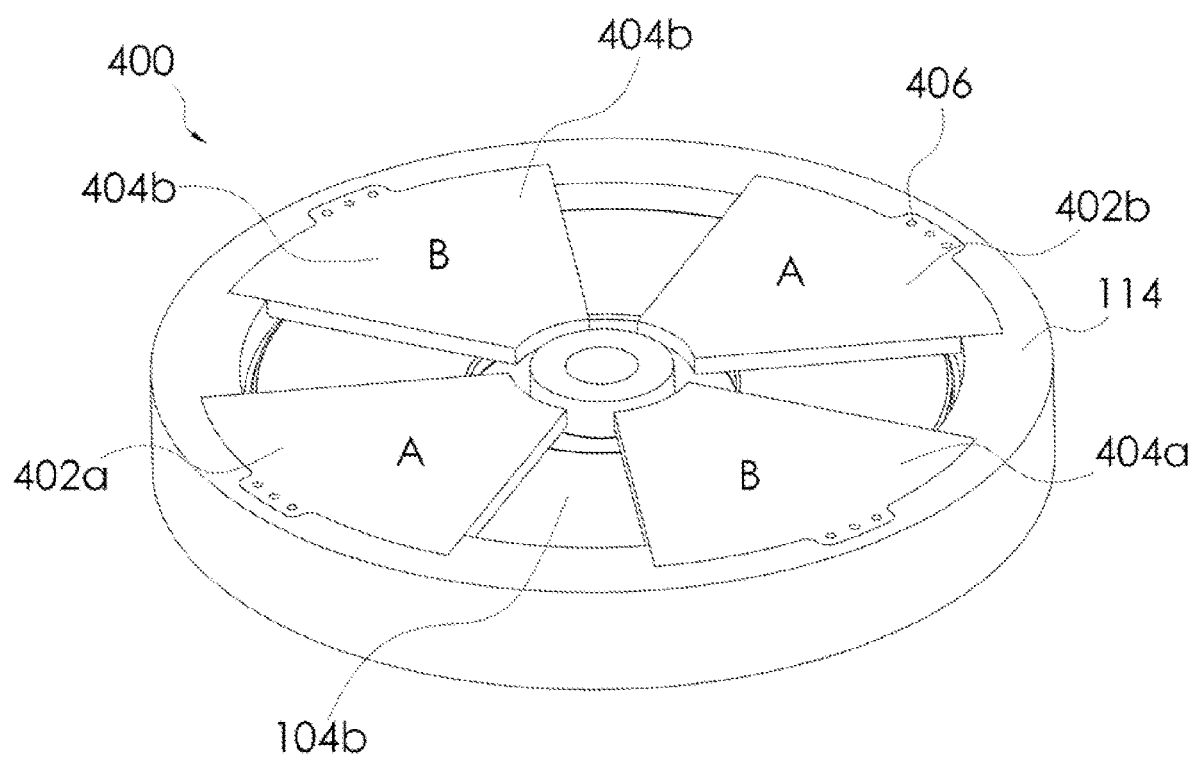
FIG. 6 shows a perspective view of the axial flux machine shown in FIGS. 4 and 5, with the shaft and upper rotor assembly removed so that the orientation of the respective segment types can be clearly seen.

FIG. 6 shows a perspective view of the machine 400 shown in FIGS. 4 and 5, with the shaft 110 and the upper rotor assembly 108a removed so that the orientation of the respective segment types can be clearly seen. As indicated by the labels on the respective segments 402a, 402b, 404a, 404b in FIGS. 4 and 6, in some implementations, two of the segments (e.g., the segments 402a and 402b) may be of a type "A," and two of the segments (e.g., the segments 404a and 404b) may be of a type "B." In other implementations, different quantities of respective segments types may be provided, and/or additional segment types (e.g., one or more type "C" segments) may be employed together with the other segment types. For instance, in some implementations, the machine 400 may instead be configured with (1) three segments of type "A" and one segment of type "B," (2) two segments of type "B" and one segment of type "A," (3) one segment of type "A" and one segment of type "B," (4) two segments of type "A," one segment of type "B," and one segment of type "C," and so on. As can also be seen in FIGS. 4-6, certain types of segments may include one or more terminals 406 configured to enable connections between conductive traces on the segments (e.g., conductive traces forming one or more windings) and circuitry external to the segments. Examples of particular types of segments that may include such terminal(s) 406 are described below.

In some implementations, the poles of the magnets 104a, 104b of the machine 400 may be distributed uniformly about the rotor's axis of rotation, as is the case for the machine 100 shown in FIGS. 1 and 2. In other implementations, the poles of the magnets 104a, 104b of the machine 400 may be distributed non-uniformly about the rotor's axis of rotation, as is the case with the machine 300 shown in FIG. 3.

Figure 7:
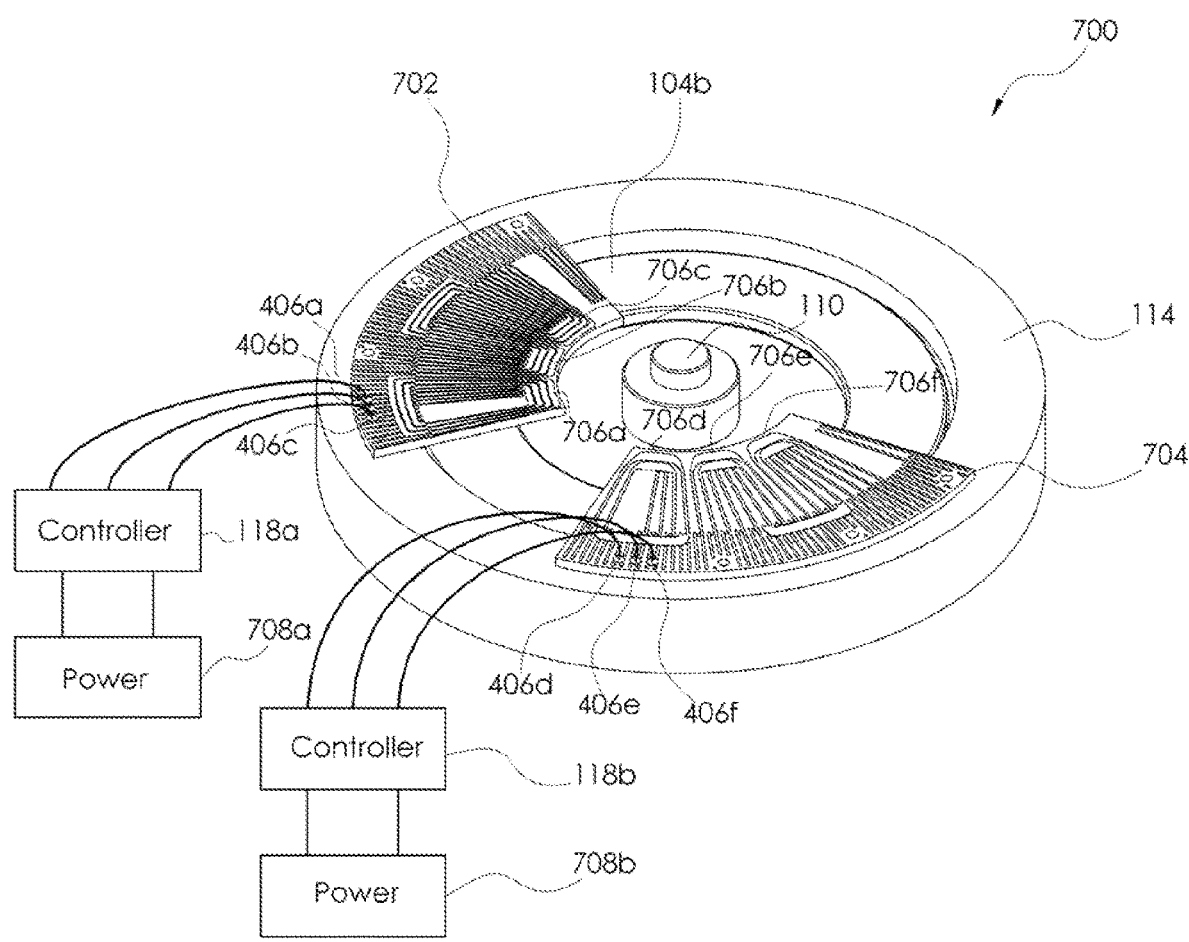
FIG. 7 shows a first example implementation of a planar axial flux machine that includes multiple different stator structure types.

FIG. 7 shows a first example implementation of a planar axial flux machine 700 that includes multiple different stator structure types, as described in connection with FIGS. 4-6. Similar to FIG. 6, the upper rotor assembly 108a is not depicted in FIG. 7, to enable a clear view of the two example stator segments 702, 704 that are included in the machine 700. Although only two stator segments 702, 704 are shown in FIG. 7, as noted previously, it should be appreciated that one or more additional stator segments of either or both of the types illustrated and/or one or more additional segments of a different type (such as those described herein) may be employed in other implementations.

As shown in FIG. 7, the segment 702 and the segment 704 may each include one or more windings 706. In some implementations, the windings 706 of the segment 702 may be electrically isolated from, and have substantially different electrical characteristics than, the windings 706 of the segment 704. In the illustrated example, for instance, the segment 702 includes windings 706a, 706b and 706c for three respective phases, with the winding for each such phase forming a total of four turns, whereas the segment 704 includes windings 706d, 706e and 706f for three respective phases, with the winding for each such phase forming a total of two turns.

In embodiments in which the windings 706a, 706b, 706c of the segment 702 are connected to the terminals 406a, 406b, 406c using a "Y" configuration (e.g., per FIG. 8A), two of the windings 706 will be seen between each respective pair of the terminals 406a, 406b, 406c. In embodiments in which the windings 706a, 706b, 706c of the segment 702 are connected to the terminals 406a, 406b, 406c using a "delta" configuration (e.g., per FIG. 8B), each respective pair of the terminals 406a, 406b, 406c will see one winding 706 that is connected in parallel with a combination of the two other windings 706 connected in series. In embodiments in which the windings 706a, 706b, 706c of the segment 702 are connected to three separate pairs of terminals (e.g., per FIG. 8C), each respective pair of the terminals 406a, 406b, 406c will see just one of the windings 706.

Similarly, in embodiments in which the windings 706d, 706e, 706f of the segment 704 are connected to the terminals 406d, 406e, 406f using a "Y" configuration (e.g., per FIG. 8A), two of the windings 706 will be seen between each respective pair of the terminals 406d, 406e, 406f. In embodiments in which the windings 706d, 706e, 706f of the segment 704 are connected to the terminals 406d, 406e, 406f using a "delta" configuration (e.g., per FIG. 8B), each respective pair of the terminals 406d, 406e, 406f will see one winding 706 that is connected in parallel with a combination of the two other windings 706 connected in series. In embodiments in which the windings 706d, 706e, 706f of the segment 704 are connected to three separate pairs of terminals (e.g., per FIG. 8C), each respective pair of the terminals 406d, 406e, 406f will see just one of the windings 706.

In any of the foregoing terminal configurations, the flux linkage with the rotor magnets, as seen between a given set of the terminals, will depend on the area swept by the turns of the windings 706 seen by those terminals, and the amount of flux from the rotors that is captured by those areas. Accordingly, with any such terminal configurations, the flux linkage enabled by the windings 706 of the segment 702, as seen between a given pair of the terminals 406 of the segment 702, will be substantially different than the flux linkage enabled by the windings 706 of the segment 704, as seen between a given pair of the terminals 406 of the segment 704. The different electrical characteristics of the windings 706 of the two stator segments 702, 704 may allow the respective stator segments 702, 704 to be configured for optimal performance under significantly different operating regimes, e.g., torques and speeds. In this manner, the stator segments 702, 704 may be relied upon for energy conversion in the complementary operating conditions for which they are designed, using the same magnetic structure and assembly.

As illustrated in FIG. 7, the segment 702 may include multiple terminals (e.g., terminals 406a, 406b and 406c) that may be connected to a controller 118a, and the segment 704 may likewise include multiple terminals (e.g., terminals 406d, 406e and 406f) that may be connected to a controller 118b. The controllers 118a, 118b may, for example, each include a set of switches, e.g., metal oxide semiconductor field effect transistor (MOSFET) switches, and control circuitry configured to selectively open and control those switches, to achieve the functionality described herein. As also shown in FIG. 7, in some implementations, the controller 118a may further be connected to a power supply (or energy storage unit) 708a, and the controller 118b may further be connected to a power supply (or energy storage unit) 708b. In some implementations, the power supply (or energy storage unit) 708a may be separate from the power supply (or energy storage unit) 708b. In other implementations, the power supply (or energy storage unit) 708a may be the same component as the power supply (or energy storage) unit 708b.

In implementations in which the controller 118a is connected to a power supply, the controller 118a may selectively cause multiple phases of a power signal to be applied to the windings 706a, 706b and 706c of the segment 702. Similarly, in implementations in which the controller 118b is connected to a power supply, the controller 118b may selectively cause multiple phases of a power signal to be applied to the windings 706d, 706e and 706f of the segment 704. In implementations in which the controller 118a is connected to an energy storage unit, the controller 118a may instead regulate the supply of power from the windings 706a, 706b and 706c to the energy storage unit 708a. Similarly, in implementations in which the controller 118b is connected to an energy storage unit, the controller 118b may instead regulate the supply of power from the winding 706d, 706e and 706f to the energy storage unit 708b. In some such implementations, one or more stator segments (e.g., the segment 702) may be configured as a motor having windings 706 with a first set of electrical characteristics, and the other segment (e.g., the segment 704) may be configured as a generator having windings 706 with a second, different set of electrical characteristics. In other implementations, one or more stator segments (e.g., the segment 702) may be configured as a motor having windings 706 with a first set of electrical characteristics, and the other segment (e.g., the segment 704) may also be configured as a motor, but may have windings 706 with a second, different set of electrical characteristics. In still other implementations, one or more stator segments (e.g., the segment 702) may be configured as a generator having windings 706 with a first set of electrical characteristics, and the other segment (e.g., the segment 704) may also be configured as a generator, but may have windings 706 with a second, different set of electrical characteristics.

As noted above, in some embodiments, a given stator structure (e.g., one of the stator segments 702, 704) may include windings 706 for multiple electrical phases, and energy may be transferred between those windings 706 and external circuitry via terminals 406 located on that stator structure. For instance, in the example machine 700 shown in FIG. 7, the stator segment 702 includes three terminals 406a, 406b and 406c that are electrically connected to three windings 706a, 706b and 706c for respective phases supported by the stator segment 702, and the stator segment 704 includes three terminals 406d, 406e and 406f that are electrically connected to three windings 706d, 706e and 706f for respective phases supported by the stator segment 704.

Figure 8A:
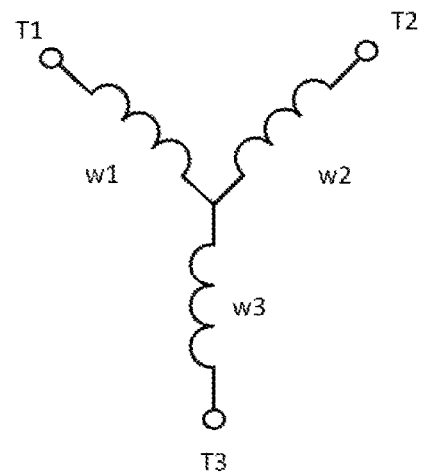
FIG. 8A illustrates a first possible scheme for driving (or receiving power from) three windings via multiple terminals.
Figure 8B:
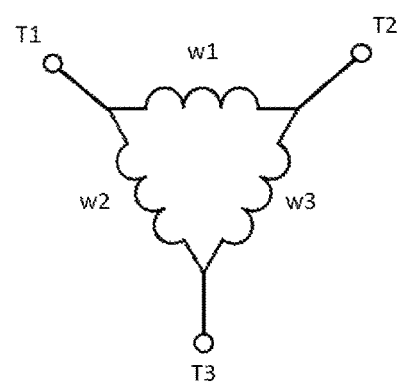
FIG. 8B illustrates a first possible scheme for driving (or receiving power from) three windings via multiple terminals.
Figure 8C:
FIG. 8C illustrates a first possible scheme for driving (or receiving power from) three windings via multiple terminals.

FIGS. 8A-C illustrate three possible schemes for driving (or receiving power from) three windings (i.e., windings W1, W2 and W3) via multiple terminals. The schemes shown in FIGS. 8A and 8B allow the use of just three terminals (i.e., terminals T1, T2 and T3) to drive (or receive power from) three windings (i.e., windings W1, W2 and W3) for respective phases. The scheme shown in FIG. 8C, on the other hand, requires additional terminals (e.g., terminals T1, T2, T3, T4, T5 and T6) to drive (or receive power from) three windings (i.e., windings W1, W2 and W3) for respective phases. The connection configuration shown in FIG. 8A is commonly referred to as a "Y" configuration. The connection configuration shown in FIG. 8B is commonly referred to as a "delta" configuration. Any of the foregoing configurations could be used to interconnect the windings 706 and the terminals 406 of the respective stator segments 702, 704 shown in FIG. 7, with additional terminals being provided if the configuration of FIG. 8C is employed for either such segment.

For implementations of the machine 700 (shown in FIG. 7) in which a given stator segment 702, 704 includes only three terminals to drive (or receive power from) three windings, at least the following four configurations are possible: (1) the windings W1, W2 and W3 in FIG. 8A may correspond to the windings 706a, 706b and 706c for the three phases of the stator segment 702 shown in FIG. 7, and the terminals T1, T2 and T3 in FIG. 8A may correspond to the three terminals 406a, 406b and 406c of the stator segment 702 shown in FIG. 7; (2) the windings W1, W2 and W3 in FIG. 8A may correspond to the windings 706d, 706e and 706f for the three phases of the stator segment 704 shown in FIG. 7, and the terminals T1, T2 and T3 in FIG. 8A may correspond to the three terminals 406d, 406e and 406f of the stator segment 704 shown in FIG. 7; (3) the windings W1, W2 and W3 in FIG. 8B may correspond to the windings 706a, 706b and 706c for the three phases of the stator segment 702 shown in FIG. 7, and the terminals T1, T2 and T3 in FIG. 8B may correspond to the three terminals 406a, 406b and 406c of the stator segment 702 shown in FIG. 7; or (4) the windings W1, W2 and W3 in FIG. 8B may correspond to the windings 706d, 706e and 706f for the three phases of the stator segment 704 shown in FIG. 7, and the terminals T1, T2 and T3 in FIG. 8B may correspond to the three terminals 406d, 406e and 406f of the stator segment 704 shown in FIG. 7.

In any of the foregoing configurations, it can be appreciated that, due to the different winding configurations (e.g., different numbers of turns per winding) of the stator segments 702, 704, values of various electrical characteristics (e.g., resistance, flux linkage, etc.), between any two of the terminals 406a, 406b and 406c of the stator segment 702, as measured when those terminals are not connected to external circuitry, would be substantially different than the values of those same electrical characteristics between any two of the terminals 406d, 406e and 406f of the stator segment 704, also as measured when those terminals are not connected to external circuitry. As used herein, a difference is considered "substantial" if it is greater than what would be expected due to standard manufacturing tolerances.

Figure 9:
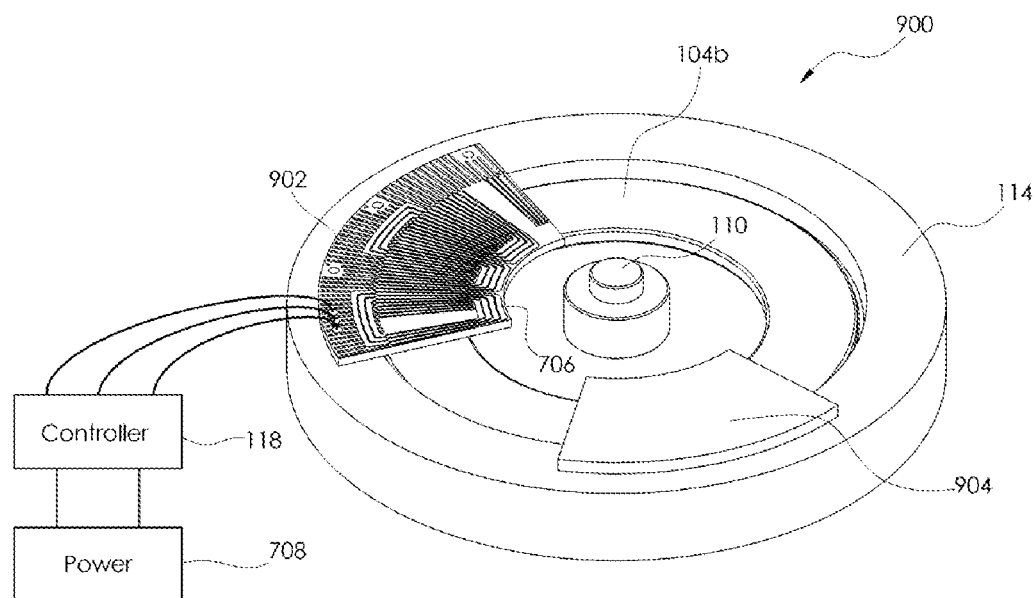
FIG. 9 shows a second example implementation of a planar axial flux machine that includes multiple different stator structure types.

FIG. 9 shows a second example implementation of a planar axial flux machine 900 that includes multiple different stator structure types, as described in connection with FIGS. 4-6. Although only two stator segments 902, 904 are shown in FIG. 9, as noted previously, it should be appreciated that one or more additional stator segments of either or both of the types illustrated and/or one or more additional segments of a different type may be employed in other implementations. As was the case with FIG. 7, the upper rotor assembly 108a is not depicted in FIG. 9, to enable a clear view of the two example stator segments 902, 904 that are included in the machine 900.

As shown, the stator segment 902 of the machine 900 may be configured similar to the stator segment 702 (or the stator segment 704) shown in FIG. 7 in that it may have one or more windings 706 connected to a controller 118 via one or more terminals 406, and in that the controller 118 may, in turn, be connected to a power supply (or energy storage unit) 708, thus enabling the segment 902 to operate in either a motor or a generator mode. The segment 904 of the machine 900, however, may be a conductive sheet of material (e.g., aluminum or copper) positioned in the gap within the active region of the machine 900 such that eddy currents may be generated as the rotor rotates, thus causing the creation of a drag force on the rotor that increases as a function of rotor speed. As used herein, the term "conductive sheet" is meant to refer to any conductive structure that occupies a planar region such that eddy currents may be induced within the structure, and is thus intended to encompass conductive planar structures with holes or other discontinuities (e.g., a planar mesh structure) as well as conductive planar structures that lack such discontinuities, e.g., continuous aluminum or copper sheets.

Advantageously, the drag introduced via the segment 904 may be either selectively supplemented or selectively counteracted by appropriately operating the controller 118, thus allowing the motor or generator behavior of the segment 902 to fine tune the level of drag imposed on the rotor of the machine 900. The combination of stator segment 902 with the stator segment 904 in such a structure may thus operate as an eddy current dashpot, with programmable dynamics via the motor or generator action of stator 902. In some implementations, the overall drag coefficient of such a dashpot may additionally or alternatively be varied by adjusting the extent to which the stator segment 904 protrudes into the gap of the machine 900. The machine 900 may find useful applications in scenarios where an adjustable level of drag is desirable, such as for stationary bicycles or other exercise equipment.

Figure 10:
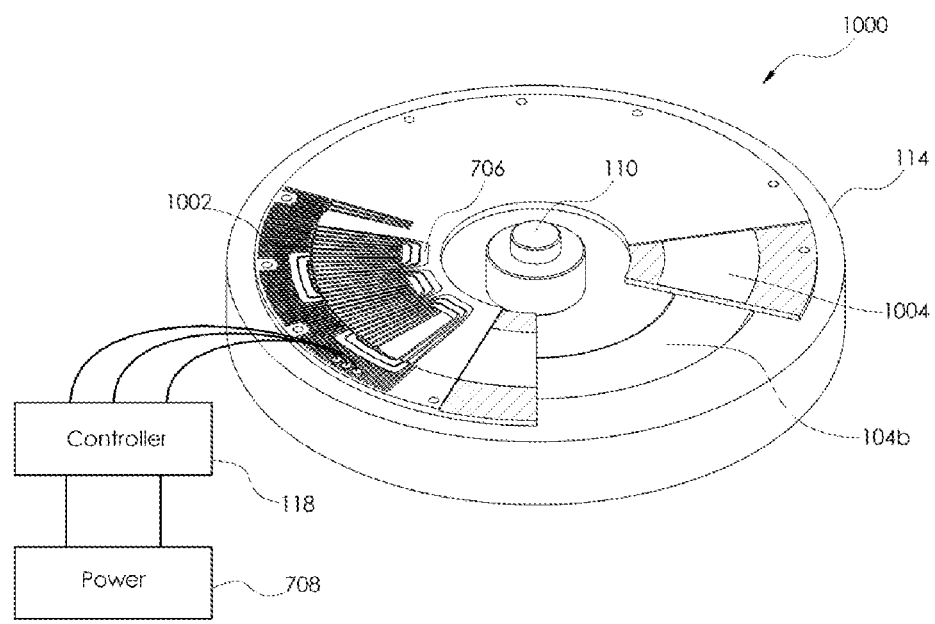
FIG. 10 shows a third example implementation of a planar axial flux machine that includes multiple different stator structure types.

FIG. 10 is a partial cut-away diagram showing a third example implementation of a planar axial flux machine 1000 that includes multiple different stator structure types. Once again, the upper rotor assembly 108a is not depicted in FIG. 10, to enable a clear view of the different stator structure types that are included in the machine 1000. As shown in FIG. 10, the machine 1000 may include a segment 1002 (and associated circuitry 118, 708) that is identical to, or similar to, the segment 902 (and associated circuitry 118, 708) described in connection with FIG. 9. The machine 1000 is thus similar to the machine 900 in terms of the ability of the controller 118 to cause the segment 1002 to operate in a motor mode or a generator mode. The machine 1000 differs from the machine 900 (shown in FIG. 9), however, in that the machine includes an annular sheet 1004 of conductive material (e.g., aluminum or copper) that extends throughout the active region of the machine 1000, including a region underneath the segment 1002, e.g., on a different layer than the windings 706 of the segment 1002. Similar to the segment 904 of the machine 900, eddy currents may be generated within the annular sheet 1004 of the machine 1000 as the rotor of the machine 1000 rotates, thus causing the creation of a drag force on the rotor that increases as a function of rotor speed. Similar to the machine 900, the drag introduced via the annular conductive sheet 1004 may be either selectively supplemented or selectively counteracted by appropriately operating the controller 118, thus allowing the motor or generator behavior of the segment 1002 to fine tune the level of drag imposed on the rotor of the machine 1000.

Although only one segment 1002 is shown in FIG. 10, it should be appreciated that one or more additional stator segments 1002 and/or one or more additional segments of a different type (such as those described herein) may be employed in other implementations.

Figure 11:
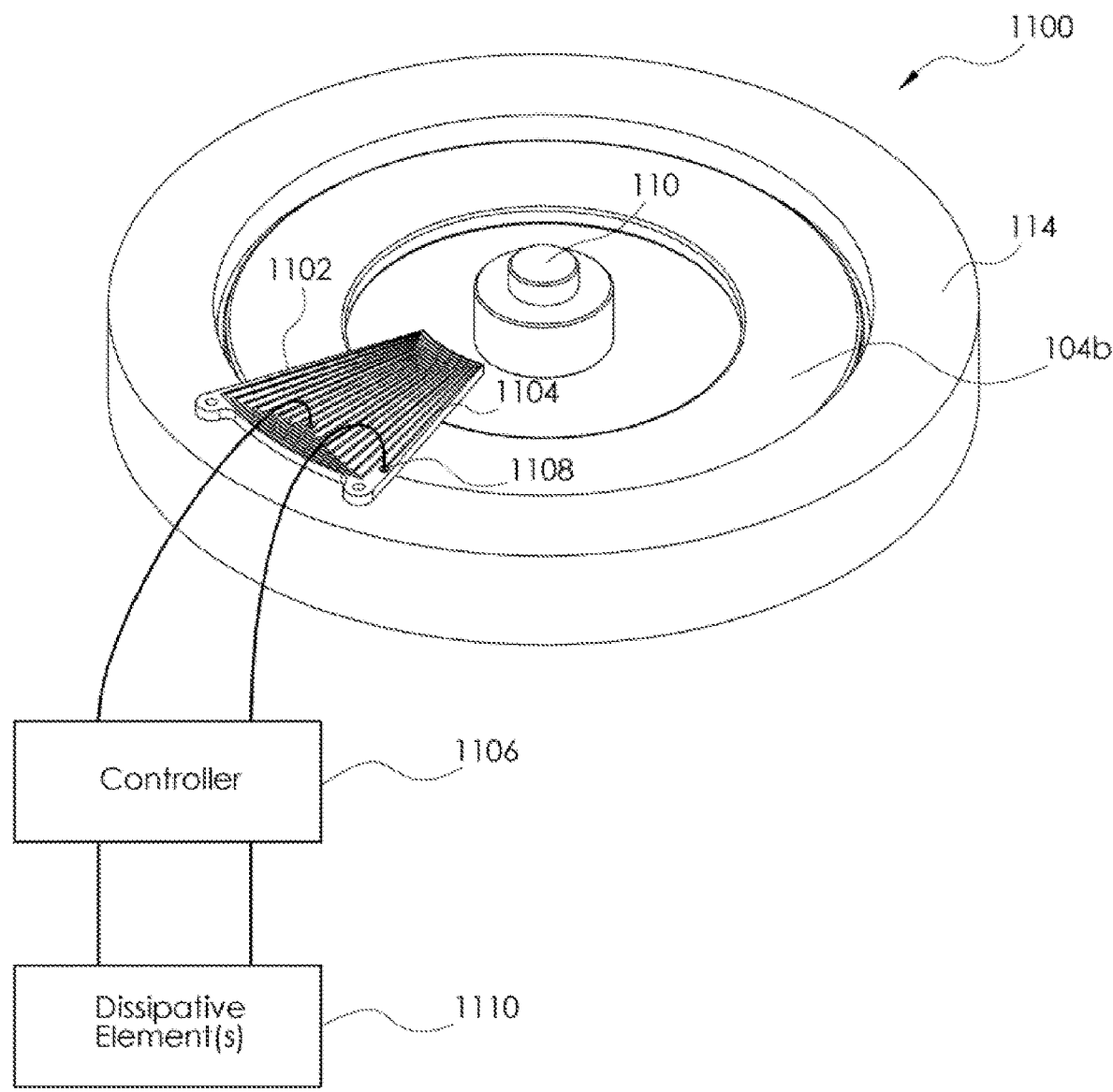
FIG. 11 shows an example of a planar axial flux machine having a novel segment configuration that may be employed either alone, or together with one or more additional or different segment structures.

FIG. 11 shows an example of a planar axial flux machine 1100 having a novel segment configuration that may be employed either alone or together with one or more additional or different segment structures. As shown, the machine 1100 may include a segment 1102 that includes one or more windings 1104 connected to a controller 1106 via two or more terminals 1108. The controller 1106 may, for example, include one or more switches, e.g., MOSFET switches, and control circuitry configured to selectively open and control such switch(es) to achieve the functionality described herein. As also shown, in some implementations, the controller 1106 may further be connected to one or more dissipative elements 1110 (e.g., one or more resistors). In some implementations, the switch(es) of the controller 1106b may be selectively closed as to connect the dissipative element(s) between a pair of terminals 1108 connected to respective ends of a winding 1104. By interconnecting the ends of the winding 1104 in such a manner, motion of the rotor may cause eddy currents to circulate through the winding 1104, as well as the dissipative element(s) 1110, thus generating a drag force on the rotor of the machine 1100 that varies as a function of rotor speed, similar to the behavior of conductive sheets 904, 1004 described above. Varying value(s) of the dissipative element(s) 1110 may allow the magnitude of such a drag force to be adjusted. Accordingly, in some implementations, the switch(es) of the controller 1106 may be rapidly opened and closed at different rates to adjust an average value of the resistance that is seen between the terminals 1108. In some implementations, the dissipative element(s) 1110 may be omitted, and the switch(es) of the controller 1106 may instead directly interconnect the terminals 1108, to achieve a similar result, but without the additional power dissipation provided by resistors or the like.

In some implementations, multiple windings 1104 may be employed on one or more such segments 1102 and the controller 1106 may selectively establish connections (either directly or via one or more dissipative elements 1110) between pairs of terminals electrically connected to the ends of respective windings 1104. In such embodiments, the amount of drag imposed on the rotor of the machine 1100 may additionally or alternatively be adjusted by altering a number of respective windings 1104 for which such connections are established. Although only one segment 1102 is shown in FIG. 11, it should be appreciated that one or more additional stator segments 1102 and/or one or more additional segments of a different type (such as those described herein) may be employed in other implementations.

Figure 12:
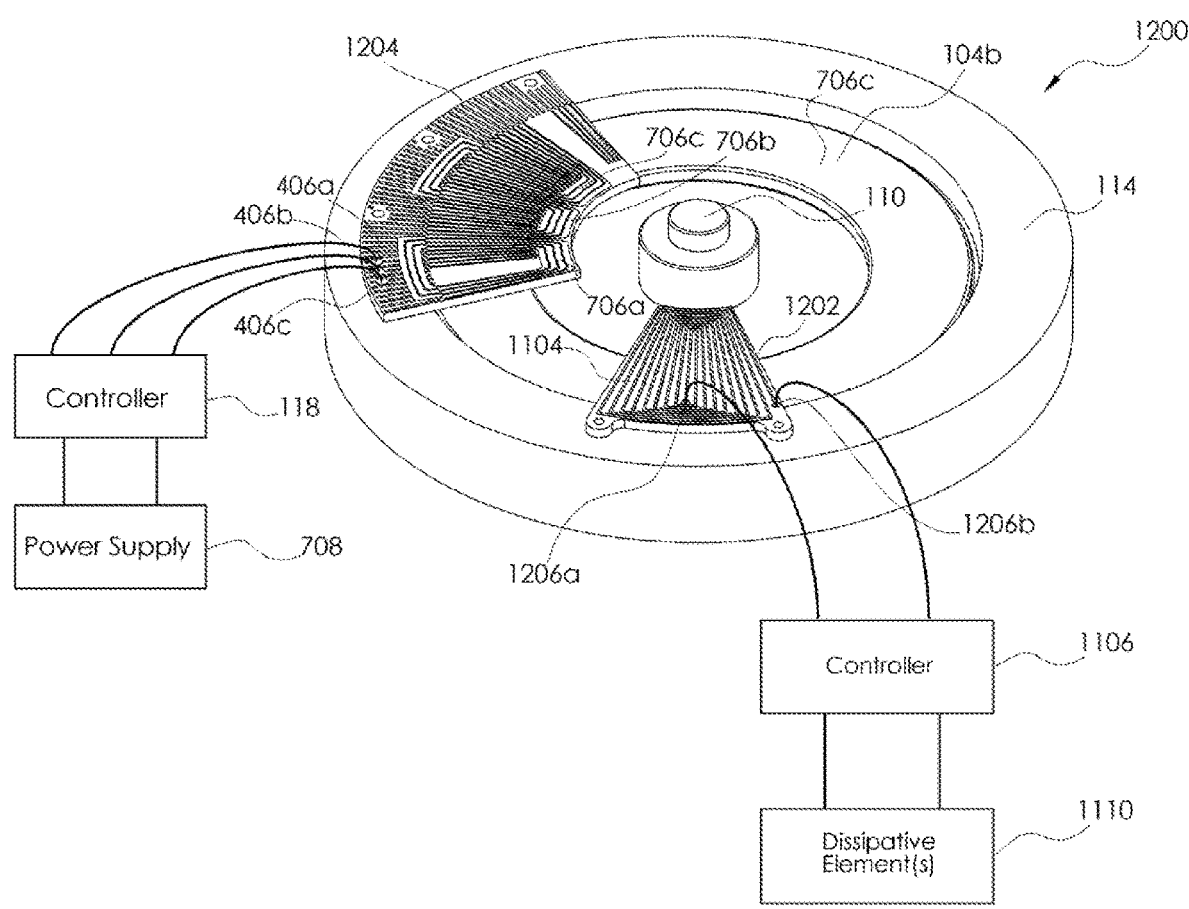
FIG. 12 shows a fourth example implementation of a planar axial flux machine that includes multiple different stator structure types.

FIG. 12 shows a fourth example implementation of a planar axial flux machine 1200 that includes multiple different stator structure types, as described in connection with FIGS. 4-6. As with the other examples, the upper rotor assembly 108a is not depicted in FIG. 12, to enable a clear view of the two example stator segments 1202, 1204 that are included in the machine 1200. As shown, the machine 1200 may include both (A) a segment 1202 and associated circuitry 1106, 1110 similar to the segment 1102 and associated circuitry 1106, 1110 of the machine 1100 (shown in FIG. 11), and (B) a stator segment 1204 and associated circuitry 118, 708 similar to the stator segment 702 (or the stator segment 704) shown in FIG. 7. In some implementations, the stator segment 1204 and associated circuitry 118, 708 may operate as a motor or generator, and the stator segment 1202 may operate as controllable brake (or other drag generating component) for the rotor of the machine 1200. Although only two stator segments 1202, 1204 are shown in FIG. 12, as noted previously, it should be appreciated that one or more additional stator segments of either or both of the types illustrated and/or one or more additional segments of a different type may be employed in other implementations.

As shown in FIG. 12, the segment 1202 and the segment 1204 may each include one or more windings 706, 1104. In some implementations, the winding(s) 1104 of the segment 1202 may be electrically isolated from, and have substantially different electrical characteristics than, the winding(s) 706 of the segment 1204. In the illustrated example, for instance, the segment 1204 includes windings 706a, 706b and 706c for three respective phases, with the winding for each such phase forming a total of four turns, whereas the segment 1202 includes just one winding 1104 forming a total of eight turns.

In embodiments in which the windings 706a, 706b, 706c of the segment 1204 are connected to the terminals 406a, 406b, 406c using a "Y" configuration (e.g., per FIG. 8A), two of the windings 706 will be seen between each respective pair of the terminals 406a, 406b, 406c. In embodiments in which the windings 706a, 706b, 706c of the segment 1204 are connected to the terminals 406a, 406b, 406c using a "delta" configuration (e.g., per FIG. 8B), each respective pair of the terminals 406a, 406b, 406c will see one winding 706 that is connected in parallel with a combination of the two other windings 706 connected in series. In embodiments in which the windings 706a, 706b, 706c of the segment 1204 are connected to three separate pairs of terminals (e.g., per FIG. 8C), each respective pair of the terminals 406a, 406b, 406c will see just one of the windings 706.

In any of the foregoing terminal configurations, the flux linkage with the rotor magnets, as seen between a given set of the terminals, will depend on the area swept by the turns of the windings 706 seen by those terminals, and the amount of flux from the rotors that is captured by those areas. Accordingly, with any such terminal configurations, the flux linkage enabled by the winding 1104 of the segment 1202, as seen between the terminals 1206a, 1206b, will be substantially different than the flux linkage enabled by the windings 706 the segment 1204, as seen between a respective pair of the terminals 406. The different electrical characteristics of the windings 1104, 706 of the two stator segments 1202, 1204 may thus allow the respective stator segments to be configured to perform their respective functions (e.g., motor/generator action and braking action) in an optimal manner.

In a similar manner as the embodiment disclosed in connection with FIG. 7, it can be appreciated that, due to the different winding configurations (e.g., different numbers of turns per winding) of the stator segments 1202, 1204, values of various electrical characteristics (e.g., resistance, flux linkage, etc.) between the two terminals 1206a, 1206b of the stator segment 702, as measured when those terminals are not connected to external circuitry, would be substantially different than the values of those same electrical characteristics between any two of the terminals 406a, 406b and 406c of the stator segment 1204, also as measured when those terminals are not connected to external circuitry.

Figure 13:
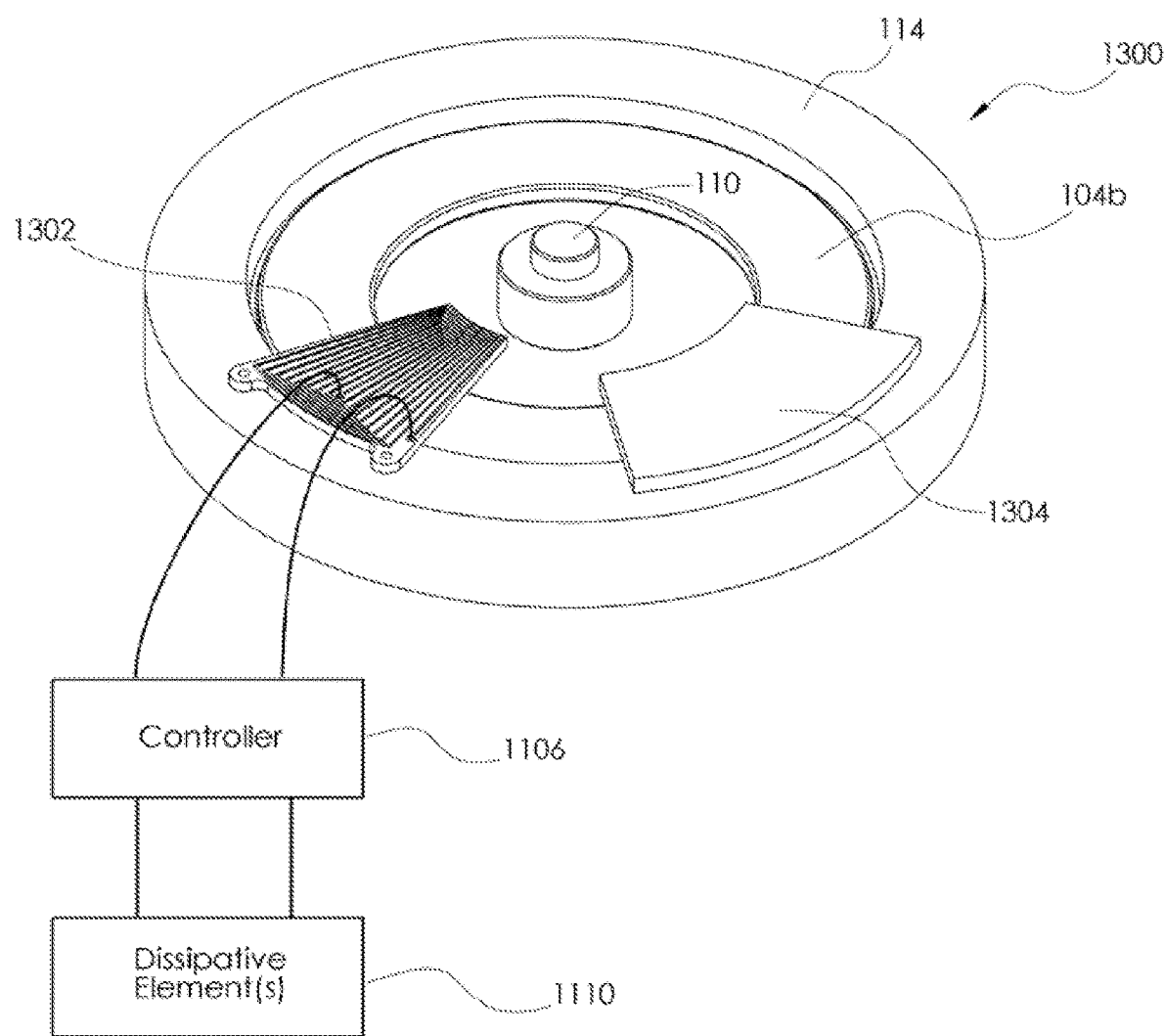
FIG. 13 shows a fifth example implementation of a planar axial flux machine that includes multiple different stator structure types.

FIG. 13 shows a fifth example implementation of a planar axial flux machine 1300 that includes multiple different stator structure types, as described in connection with FIGS. 4-6. Once again, the upper rotor assembly 108a is not depicted in FIG. 13, to enable a clear view of the two example stator structures 1302, 1304 that are included in the machine 1300. As shown, the machine 1300 may include both (A) a stator segment 1302 and associated circuitry 1106, 1110 similar to the stator segment 1102 and associated circuitry 1106, 1110 of the machine 1100 (shown in FIG. 11), and (B) a stator segment 1304 including conductive sheet of material (e.g., aluminum or copper) positioned in the gap within the active region of the machine 1300 such that eddy currents may be generated as the rotor rotates, thus causing the creation of a drag force on the rotor that increases as a function of rotor speed. In some implementations, the stator segment 1302 and associated circuitry 1106, 1110 may operate to selectively supplement the drag imposed on the rotor of the machine 1300 via the stator segment 1304, thus allowing fine tuning of the level of drag that is imposed on the rotor of the machine 1300. Although only two stator segments 1302, 1304 are shown in FIG. 13, as noted previously, it should be appreciated that one or more additional stator segments of either or both of the types illustrated and/or one or more additional segments of a different type may be employed in other implementations.

Figure 14:
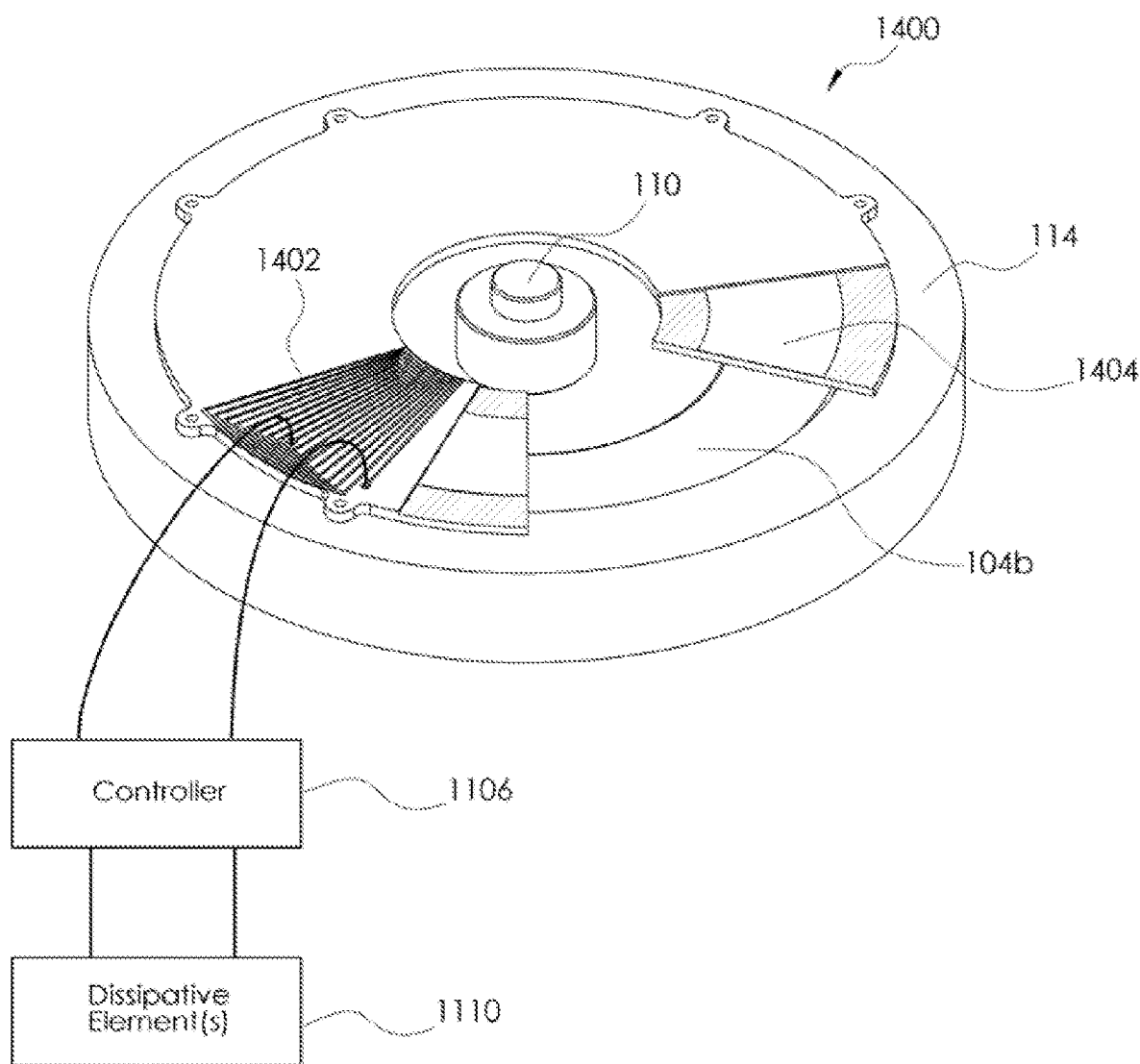
FIG. 14 shows a sixth example implementation of a planar axial flux machine that includes multiple different stator structure types.

FIG. 14 a partial cut-away diagram showing a sixth example implementation of a planar axial flux machine 1400 that includes multiple different stator structure types. Once again, the upper rotor assembly 108a is not depicted in FIG. 14, to enable a clear view of the two example stator structures 1402, 1404 that are included in the machine 1300. As shown, the machine 1400 may include both (A) a stator segment 1402 and associated circuitry 1106, 1110 similar to the stator segment 1102 and associated circuitry 1106, 1110 of the machine 1100 (shown in FIG. 11), and (B) an annular sheet 1404 of conductive material (e.g., aluminum or copper) positioned in the gap within the active region of the machine 1400 such that eddy currents may be generated as the rotor rotates, thus creating a drag force on the rotor that increases as a function of rotor speed.

Similar to the machine 1300 (shown in FIG. 13), in some implementations, the stator segment 1402 and associated circuitry 1106, 1110 may operate to selectively supplement the drag imposed on the rotor of the machine 1300 via the annular conductive sheet 1404, thus allowing fine tuning of the level of drag that is imposed on the rotor of the machine 1400. Although only two stator structure types are shown in FIG. 14, as noted previously, it should be appreciated that one or more additional stator structures of either or both of the types illustrated and/or one or more additional stator structures of a different type may be employed in other implementations.

The advantages of the various stator designs described herein are numerous. With respect to some embodiments described above, a similar performance could be obtained by mechanically combining a conventional motor with a conventional dashpot. Such motor and dashpot solutions would require thermal solutions, multiple shafts, and mechanical integration. Use of certain of the stator machine configurations described herein would eliminate these considerations.

With respect to other example embodiments described above, a similar performance could be obtained by connecting a controllable eddy current brake on the same shaft as the motor. Again, such a solution would increase system complexity and cost. In particular, additional magnetic structures would be required for the braking feature. For example, an electromagnet requiring an external power supply, or additional magnets used only when braking. Use of certain of the stator machine configurations described herein would likewise eliminate these considerations.

With respect to still other example embodiments described above, a similar performance could be obtained by connecting two or more motors designed for different operating regimes on the same shaft. A variety of mechanical challenges would accompany such a design. Use of certain of the stator machine configurations described herein would allow the motor segments to share the same magnetic circuit, rotor materials, and bearings. This would result in a simpler, more cost effective design.

Embodiments of the machine of the type described here correspond to a number of fields of application, with examples including but not limited to the following.

One application is in therapeutic or exercise equipment. Here, the role of the machine is to resist human effort, to absorb or convert some of that effort to power, while simulating a target activity. Such activities may include the force and inertial characteristics of lifting a weight, the drag of rowing a boat, the variable resistance associated with biking, and so forth. The dynamics required to simulate these activities may be achieved through feedback control, for example, of a conventional servo motor combined with energy storage and dissipation mechanisms. Use of certain of the stator machine configurations described herein would allow motor action to be integrated with dissipative stator elements with advantages that include reduced overall system cost and complexity.

In some implementations, multiple motor stator structures may additionally or alternatively be combined in a gap to meet a wide range of requirements within the same machine. For example, a motor stator segment designed for low-torque high-speed operation may be combined with a motor stator segment for high-torque, low-speed operation.

In some implementations, one or more motor/generator segments may additionally or alternatively be combined with segments specialized for inductive braking under active control. In this case, for example, a direct drive wind turbine generator (one segment) may have a braking mechanism (a braking segment) that regulates the turbine speed under high wind conditions. In a similar motor application, a braking segment may provide an emergency shaft-stop function.

The following paragraphs (P1) through (P8) describe examples of inventive concepts disclosed herein:

(P1) A planar stator for an axial flux machine (which has a rotor that includes one or more magnets that generate first magnetic flux, generally parallel to an axis of rotation of the rotor, in an active region within a gap of the axial flux machine) may include at least first, second, third, and fourth terminals, each adapted to be connected to circuitry external to the planar stator; at least one first winding arranged to be positioned within the active region, the at least one first winding having first and second ends electrically connected to the first and second terminals, respectively, wherein an electrical characteristic between the first and second terminals, as measured when the first and second terminals are not connected to the circuitry, has a first value; and at least one second winding arranged to be positioned within the active region, the at least one second winding being electrically isolated from the at least one first winding and having third and fourth ends electrically connected to the third and fourth terminals, respectively, wherein the electrical characteristic between the third and fourth terminals, as measured when the third and fourth terminals are not connected to the circuitry, has a second value which is substantially different than the first value.

(P2) A planar stator may be configured as described in paragraph (P1), wherein the at least one first winding may be disposed on a first stator segment, and the at least one second winding may be disposed on a second stator segment that is angularly offset from the first stator segment with respect to the axis of rotation.

(P3) A planar stator may be configured as described in paragraph (P1) or paragraph (P2), wherein the at least one first winding may include a first winding and at least one additional winding; the circuitry may include a power source; the first winding may be configured to support a first phase from the power source; and the at least one additional winding may be configured to support at least one additional phase from the power source so that a peak value of a second magnetic flux generated by a combination of the first winding and the at least one additional winding follows an arcuate path with respect to the axis of rotation.

(P4) A planar stator may be configured as described in any of paragraphs (P1) through (P3), wherein the electrical characteristic may include resistance, and a first resistance between the first and second terminals, as measured when the first and second terminals are not connected to the circuitry, may be at least fifty percent greater than a second resistance between the third and fourth terminals, as measured when the third and fourth terminals are not connected to the circuitry.

(P5) A planar stator may be configured as described in any of paragraphs (P1) through (P4), wherein the electrical characteristic may include flux linkage with the first magnetic flux, and a first flux linkage between the at least one first winding and the first magnetic flux, as seen between the first and second terminals, may be at least fifty percent greater than a second flux linkage between the at least one second winding and the first magnetic flux, as seen between the third and fourth terminals.

(P6) A planar stator may be configured as described in any of paragraphs (P1) through (P5), wherein the circuitry may include a first controller configured to selectively couple the first and second terminals to a power source such that, during at least a first mode of operation of the axial flux machine, the at least one first winding generates a second magnetic flux generally parallel to the axis of rotation.

(P7) A planar stator may be configured as described in any of paragraphs (P1) through (P6), wherein the circuitry may further include a second controller configured to selectively couple the third and fourth terminals to a power source such that, during at least a second mode of operation of the axial flux machine, the at least one second winding generates a third magnetic flux generally parallel to the axis of rotation.

(P8) A planar stator may be configured as described in any of paragraphs (P1) through (P7), and may further include at least one switch configured to be selectively closed to establish an electrical connection between the third and fourth terminals at a time that the at least one second winding is not coupled to an external power source.

(P9) A planar stator may be configured as described in paragraph (P8), wherein the at least one switch may be configured to establish the electrical connection between the third and fourth terminals via at least one dissipative element.

(P10) A planar stator may be configured as described in paragraphs (P8) or paragraph (P9), wherein the circuitry may further comprise a second controller configured to cause the at least one switch to be modulated to control a time average conductivity between the third and fourth terminals.

(P11) A planar stator may be configured as described in any of paragraphs (P1) through (P10), wherein the circuitry may further comprise a second controller configured to selectively couple the third and fourth terminals to an energy storage element such that, during at least a second mode of operation of the axial flux machine, the energy storage element receives power generated by the second winding in response to rotation of the rotor.

(P12) A planar stator may be configured as described in any of paragraphs (P1) through (P11), wherein the circuitry may further comprise a first controller configured to selectively couple the first and second terminals to an energy storage element such that, during at least a first mode of operation of the axial flux machine, the energy storage element receives power generated by the first winding in response to rotation of the rotor.

(P13) A planar stator may be configured as described in any of paragraphs (P1) through (P12), wherein the circuitry may further comprise a second controller configured to selectively couple the third and fourth terminals to an energy storage element such that, during at least a second mode of operation of the axial flux machine, the energy storage element receives power generated by the second winding in response to rotation of the rotor.

(P14) A planar stator may be configured as described in any of paragraphs (P1) through (P13), and may further include at least one switch configured to be selectively closed to establish an electrical connection between the first and second terminals at a time that the at least one first winding is not coupled to an external power source.

(P15) A planar stator may be configured as described in paragraph (P14), wherein the at least one switch may be configured to establish the electrical connection between the first and second terminals via at least one dissipative element.

(P16) A planar stator may be configured as described in paragraphs (P14) or paragraph (P15), wherein the circuitry may further comprise a second controller configured to cause the at least one switch to be modulated to control a time average conductivity between the first and second terminals.

(P17) A planar stator for an axial flux machine (which has a rotor that includes one or more magnets that generate first magnetic flux, generally parallel to an axis of rotation of the rotor, in an active region within a gap of the axial flux machine) may include a first conductive sheet arranged to be positioned within the active region so that generation of eddy currents within the first conductive sheet imposes a drag force on the rotor; and at least a first winding arranged to be positioned within the active region, the first winding having at least first and second terminals electrically connected to respective ends of the first winding.

(P18) A planar stator may be configured as described in paragraph (P17), and may further include a controller configured to selectively couple the first and second terminals to a power source such that, during at least a first mode of operation of the axial flux machine, the first winding generates second magnetic flux generally parallel to the axis of rotation.

(P19) A planar stator may be configured as described in paragraph (P17) or paragraph (P18), and may further include a controller configured to selectively couple the first and second terminals to an energy storage element such that, during at least a first mode of operation of the axial flux machine, the energy storage element receives power generated by the first winding in response to rotation of the rotor.

(P20) A planar stator may be configured as described in any of paragraphs (P17) through (P19), and may further include at least one switch configured to be selectively closed to establish an electrical connection between the first and second terminals at a time that the first winding is not coupled to an external power source.

(P21) A planar stator may be configured as described in paragraph (P20), wherein the at least one switch may be configured to selectively establish the electrical connection between the first and second terminals via at least one dissipative element.

(P22) A planar stator may be configured as described in paragraph (P20) or paragraph (P21), and may further comprise a controller configured to cause the at least one switch to be modulated to control a time average conductivity between the first and second terminals.

(P23) A planar stator for an axial flux machine (which has a rotor that includes one or more magnets that generate first magnetic flux, generally parallel to an axis of rotation of the rotor, in an active region within a gap of the axial flux machine) may include at least a first winding arranged to be positioned within the active region, the first winding having at least first and second terminals electrically connected to respective ends of the first winding; and at least one switch configured to be selectively closed to establish an electrical connection between the first and second terminals at a time that the first winding is not coupled to an external power source.

(P24) A planar stator may be configured as described in paragraph (P23), wherein the at least one switch may be further configured to establish the electrical connection between the first and second terminals via at least one dissipative component.

(P25) A planar stator may be configured as described in paragraph (P23) or paragraph (P24), and may first include a controller configured to cause the at least one switch to be modulated to control a time average conductivity between the first and second terminals.

(P26) An axial flux machine, with at least two planar stator segments disposed around the axis of rotation, where the planar segments differ, and at least one stator segment is a printed circuit stator capable of producing motor action under suitable control.

(P27) The machine described in paragraph (P26), where at least one stator segment is a printed circuit stator capable of producing motor action, and at least one stator segment is a plate of conductive material.

(P28) The machine described in paragraph (P27), in which the plate of conductive material can be moved radially in or out of the gap.

(P29) The machine described in any one of paragraphs (P26) through (P28), where at least one stator segment is a printed circuit stator capable of producing motor action, and at least one stator segment is a printed circuit eddy current brake operable under external control.

(P30) The machine described in any one of paragraphs (P26) through (P29), in which the planar stator segments are interchangeable.

(P31) The machine described in any of paragraphs (P26) through (P30), wherein at least one stator segment and at least one conductive plate are arranged around the axis of rotation.

(P32) The machine described in any one of paragraphs (P26) through (P31), wherein the conductive plates are configured and arranged to be adjustable radially into or out of the gap.

(P33) The machine described in any one of paragraphs (P26) through (P32), wherein the conductive plates and stator segments are configured to be interchangeable.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An apparatus, comprising:
a rotor configured to rotate about an axis of rotation, the rotor including one or more magnets that generate first magnetic flux in an active region;
a first conductive sheet positioned within the active region so that generation of eddy currents within the first conductive sheet imposes a drag force on the rotor;
a stator structure including at least a first winding positioned within the active region;
at least first and second terminals connected to different portions of the first winding so that (A) application of current between the first and second terminals causes the first winding to generate a second magnetic flux in the active region or (B) flux linkage between the first winding and the one or more magnets while the rotor is rotating generates voltage between the first and second terminals;
at least a first switch configured and arranged to selectively couple one or more circuit components between the first and second terminals, thereby regulating a flow of current through the first winding; and
control circuitry configured to adjust a manner in which the first switch is operated to selectively couple the one or more circuit components between the first and second terminals and thereby selectively supplement or selectively counteract the drag force on the rotor.

2. The apparatus of claim 1, wherein:
the stator structure has a generally planar shape; and
the apparatus is an axial flux machine in which the one or more magnets generate the first magnetic flux, generally parallel to the axis of rotation, within a gap in which the stator structure is positioned.

3. The apparatus of claim 2, wherein:
the one or more circuit components include a power source; and
the control circuitry is configured to operate the first switch to selectively couple the power source between the first and second terminals of the first winding to a power source such that, during at least a first mode of operation of the axial flux machine, the first winding generates the second magnetic flux generally parallel to the axis of rotation.

4. The apparatus of claim 2, wherein:
the one or more circuit components include an energy storage element; and
the control circuitry is configured to operate the first switch to selectively couple the energy storage element between the first and second terminals such that, during at least a first mode of operation of the axial flux machine, the energy storage element receives power generated by the first winding in response to rotation of the rotor.

5. The apparatus of claim 2, wherein:
the one or more circuit components include a conductor; and
the first switch is configured and arranged to be selectively closed to establish an electrical connection between the first and second terminals via the conductor at a time that the first winding is not coupled to an external power source.

6. The apparatus of claim 5, wherein:
the control circuitry is further configured to cause the first switch to be modulated to control a time average conductivity between the first and second terminals.

7. The apparatus of claim 2, wherein:
the one or more circuit components include at least one dissipative element; and
the first switch is further configured and arranged to selectively couple the at least one dissipative element between the first and second terminals.

8. The apparatus of claim 7, wherein:
the control circuitry is further configured to cause the first switch to be modulated to control a time average conductivity between the first and second terminals.

9. A method of operating the apparatus of claim 2, comprising:
using the control circuitry to operate the first switch in a first manner to supplement or counteract the drag force on the rotor by a first amount; and
using the control circuitry to operate the first switch in a second manner to supplement or counteract the drag force on the rotor by a second amount different than the first amount.

10. The method of claim 9, further comprising:
adjusting a position of the first conductive sheet relative to the active region to alter the drag force.

11. The method of claim 9, wherein:
the one or more circuit components include a power source;
using the control circuitry to operate the first switch in the first manner comprises using the control circuitry to operate the first switch to selectively couple the power source between the first and second terminals so that the first winding generates a first amount of the second magnetic flux generally parallel to the axis of rotation; and
using the control circuitry to operate the first switch in the second manner comprises using the control circuitry to operate the first switch to selectively couple the power source between the first and second terminals so that the first winding generates a second amount of the second magnetic flux generally parallel to the axis of rotation, the second amount being different than the first amount.

12. The method of claim 9, wherein:
the one or more circuit components include at least one dissipative element;
using the control circuitry to operate the first switch in the first manner comprises using the control circuitry to modulate the first switch to selectively couple the at least one dissipative element between the first and second terminals such that a first time average conductivity is established between the first and second terminals; and
using the control circuitry to operate the first switch in the second manner comprises using the control circuitry to modulate the first switch to selectively couple the at least one dissipative element between the first and second terminals such that a second time average conductivity, which is different than the first time average conductivity, is established between the first and second terminals.

13. The apparatus of claim 1, wherein:
the one or more circuit components include a power source; and
the control circuitry is configured to operate the first switch to selectively couple the power source between the first and second terminals such that, during at least a first mode of operation of the apparatus, the first winding generates the second magnetic flux.

14. The apparatus of claim 1, wherein:
the one or more circuit components include an energy storage element; and
the control circuitry is configured to operate the first switch to selectively couple the energy storage element between the first and second terminals such that, during at least a first mode of operation of the apparatus, the energy storage element receives power generated by the first winding in response to rotation of the rotor.

15. The apparatus of claim 1, wherein:
the one or more circuit components include a conductor; and
the first switch is configured and arranged to be selectively closed to establish an electrical connection between the first and second terminals via the conductor at a time that the first winding is not coupled to an external power source.

16. The apparatus of claim 15, wherein:
the control circuitry is further configured to cause the first switch to be modulated to control a time average conductivity between the first and second terminals.

17. The apparatus of claim 1, wherein:
the one or more circuit components further include at least one dissipative element; and
the first switch is further configured and arranged to selectively couple the at least one dissipative element between the first and second terminals.

18. The apparatus of claim 17, wherein:
the control circuitry is further configured to cause the first switch to be modulated to control a time average conductivity between the first and second terminals.

19. A method of operating the apparatus of claim 1, comprising:
using the control circuitry to operate the first switch in a first manner to supplement or counteract the drag force on the rotor by a first amount; and
using the control circuitry to operate the first switch in a second manner to supplement or counteract the drag force on the rotor by a second amount different than the first amount.

20. The method of claim 19, further comprising:
adjusting a position of the first conductive sheet relative to the active region to alter the drag force.

* * * * *